United States Patent
Rothhämel et al.

(10) Patent No.: US 11,390,291 B2
(45) Date of Patent: Jul. 19, 2022

(54) METHOD AND DEVICE FOR THE ASSISTED, PARTIALLY AUTOMATED, HIGHLY AUTOMATED, FULLY AUTOMATED OR DRIVERLESS DRIVING OF A MOTOR VEHICLE

(71) Applicants: VOLKSWAGEN AG, Wolfsburg (DE); MAN TRUCK & BUS AG., Munich (DE); KNORR-BREMSE STEERING SYSTEMS GMBH, Wülfrath (DE); WABCO EUROPE BVBA, Brussels (BE)

(72) Inventors: Malte Rothhämel, Wolfsburg (DE); Bastian Witte, Schwülper (DE); Bernd Oldemeyer, Wolfsburg (DE); Lars Wülbeck, Duisburg (DE); Oliver Wulf, Neustadt (DE); Robert Otremba, Ronnenberg (DE)

(73) Assignee: Volkswagen AG

( * ) Notice: Subject to any disclaimer, the term of this patent is extended or adjusted under 35 U.S.C. 154(b) by 0 days.

(21) Appl. No.: 15/774,161

(22) PCT Filed: Nov. 10, 2016

(86) PCT No.: PCT/EP2016/077222
§ 371 (c)(1),
(2) Date: May 7, 2018

(87) PCT Pub. No.: WO2017/084951
PCT Pub. Date: May 26, 2017

(65) Prior Publication Data
US 2019/0106116 A1    Apr. 11, 2019

(30) Foreign Application Priority Data
Nov. 17, 2015    (DE) .................... 10 2015 222 605.0

(51) Int. Cl.
*B60W 50/029*    (2012.01)
*G01C 21/34*    (2006.01)
(Continued)

(52) U.S. Cl.
CPC .......... *B60W 50/029* (2013.01); *B60K 28/10* (2013.01); *B60W 30/02* (2013.01);
(Continued)

(58) Field of Classification Search
CPC ................................. B60W 50/029
See application file for complete search history.

(56) References Cited

U.S. PATENT DOCUMENTS 5,629,851 A * 5/1997 Williams .............. G01S 13/931
701/96
6,795,761 B1 * 9/2004 Lee ...................... B60W 30/02
701/41
(Continued)

FOREIGN PATENT DOCUMENTS

| CN | 103264702 A | 8/2013 |
| DE | 102011117116 A1 | 5/2013 |

(Continued)

OTHER PUBLICATIONS

Search Report for International Patent Application No. PCT/EP2016/077222; dated Jan. 24, 2017.

*Primary Examiner* — Shelley Chen
(74) *Attorney, Agent, or Firm* — Barnes & Thornburg, LLP

(57) ABSTRACT

A method for the assisted, partially automated, highly automated, fully automated or driverless driving of a motorized transportation vehicle including at least one control unit for planning the navigation and trajectory of an assisted, partially automated, highly automated, fully automated or driverless journey of the motorized transportation vehicle and
(Continued)

multiple subsystems, wherein the subsystems implement transportation vehicle movement dynamics requirements of the control unit or supply environmental data, wherein at least one subsystem is assigned a monitoring function by which the functionality of the subsystem is determined, wherein the monitoring function transmits a currently possible performance capability to the control unit which adapts the planning of the navigation and trajectory in accordance with the transmitted performance capability so that, despite a reduced performance capability, the assisted, partially automated, highly automated, fully automated or driverless journey can be continued. Also disclosed is such a device.

14 Claims, 1 Drawing Sheet

(51) Int. Cl.
*B60K 28/10* (2006.01)
*B60W 30/02* (2012.01)
*B60W 30/16* (2020.01)
*B60W 50/038* (2012.01)

(52) U.S. Cl.
CPC ........ *B60W 30/162* (2013.01); *B60W 50/038* (2013.01); *G01C 21/3415* (2013.01); *G01C 21/3461* (2013.01); *B60W 30/16* (2013.01); *B60W 2556/50* (2020.02); *B60W 2754/30* (2020.02); *B60W 2756/10* (2020.02); *B60Y 2302/05* (2013.01)

(56) References Cited

U.S. PATENT DOCUMENTS

| | | | |
|---|---|---|---|
| 8,788,176 B1* | 7/2014 | Yopp | B60W 30/10 701/96 |
| 9,036,026 B2 | 5/2015 | Dellantoni et al. | |
| 10,309,792 B2* | 6/2019 | Iagnemma | G01C 21/3461 |
| 10,831,202 B1* | 11/2020 | Askeland | G05D 1/0088 |
| 2003/0036834 A1* | 2/2003 | Kunsch | G01M 1/326 701/41 |
| 2005/0000614 A1* | 1/2005 | Kurokawa | B60C 11/14 152/209.7 |
| 2010/0094520 A1* | 4/2010 | Zagorski | G08G 1/165 340/436 |
| 2012/0212353 A1 | 8/2012 | Fung et al. | |
| 2013/0151088 A1* | 6/2013 | Ricci | G08G 1/0133 701/1 |
| 2013/0231854 A1* | 9/2013 | Rovik | G06Q 10/0639 701/1 |
| 2015/0032323 A1* | 1/2015 | Nijakowski | B60W 30/06 701/23 |
| 2015/0094901 A1* | 4/2015 | Brenneis | B60R 21/00 701/1 |
| 2015/0246678 A1* | 9/2015 | Hauler | B62D 1/28 701/25 |
| 2015/0266488 A1* | 9/2015 | Solyom | B60W 10/20 701/28 |

FOREIGN PATENT DOCUMENTS

| | | | | |
|---|---|---|---|---|
| DE | 102012201185 A1 | | 8/2013 | |
| DE | 102012202175 A1 | | 8/2013 | |
| DE | 102012202175 A1 | * | 8/2013 | .............. B60T 8/885 |
| DE | 102012007119 A1 | | 10/2013 | |
| DE | 102012217002 A1 | * | 3/2014 | .............. B60K 28/10 |
| DE | 102012217002 A1 | | 3/2014 | |
| DE | 102014213171 A1 | | 10/2015 | |
| DE | 102014213171 A1 | * | 10/2015 | ........... G05D 1/0077 |
| EP | 2390862 A2 | | 11/2011 | |
| EP | 2390862 A2 | * | 11/2011 | ........ B60W 50/0205 |
| EP | 2921362 A1 | | 9/2015 | |
| EP | 2921362 A1 | * | 9/2015 | ............ B60W 10/04 |
| WO | 2010048611 A1 | | 4/2010 | |
| WO | WO-2013149720 A1 | * | 10/2013 | .............. B60R 16/03 |

* cited by examiner

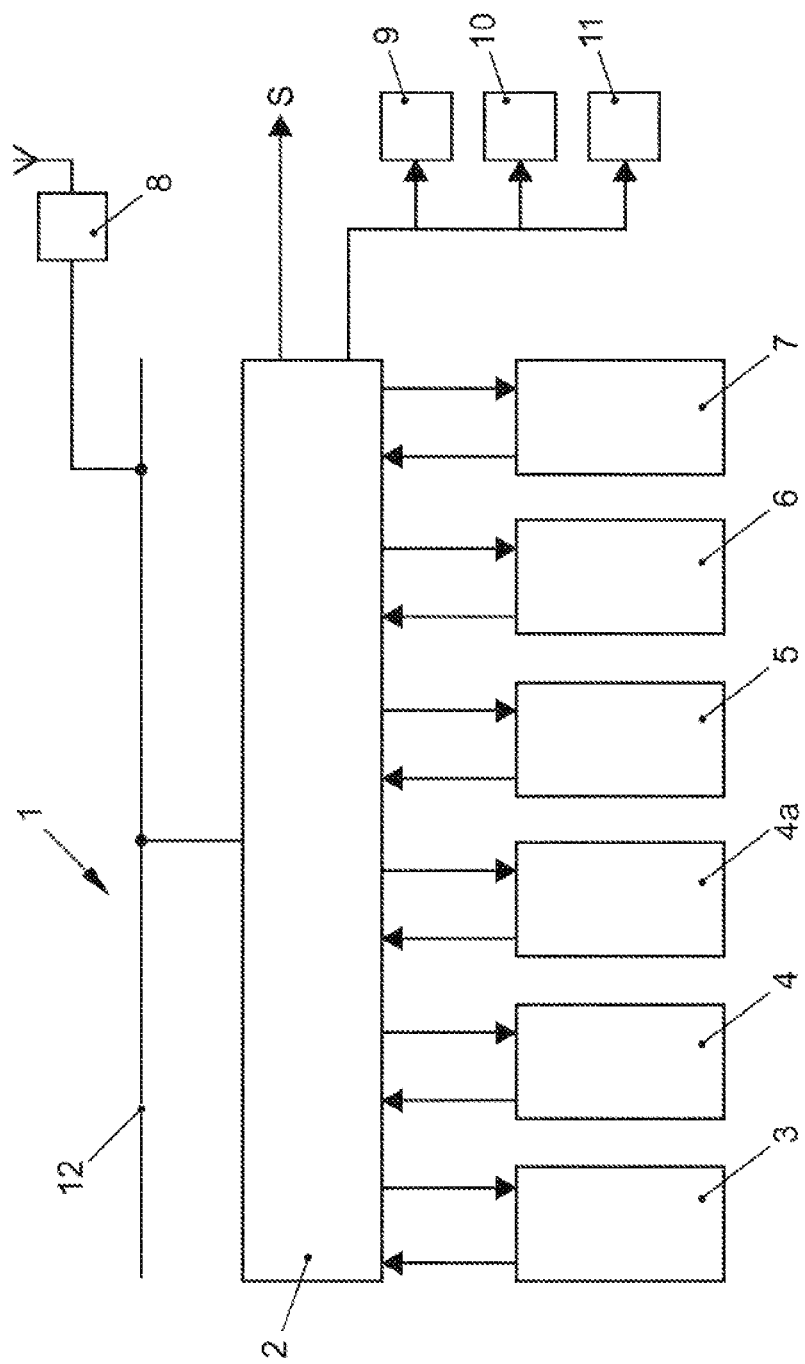

METHOD AND DEVICE FOR THE ASSISTED, PARTIALLY AUTOMATED, HIGHLY AUTOMATED, FULLY AUTOMATED OR DRIVERLESS DRIVING OF A MOTOR VEHICLE

PRIORITY CLAIM

This patent application is a U.S. National Phase of International Patent Application No. PCT/EP2016/077222, filed 10 Nov. 2016, which claims priority to German Patent Application No. 10 2015 222 605.0, filed 17 Nov. 2015, the disclosures of which are incorporated herein by reference in their entireties.

SUMMARY

Illustrative embodiments relate to a method and an apparatus for automated or driverless driving of a motorized transportation vehicle. The basis used for this is the classifications of the association of the German automotive industry (VDA) in regard to automated driving (level 1—assisted, level 2—partially automated, level 3—highly automated, level 4—fully automated and level 5—driverless). All the aforementioned levels of automation are subsequently referred to as "automated driving" in summary.

BRIEF DESCRIPTION OF THE DRAWINGS

Disclosed embodiments are explained in more detail below with reference to the single figure, in which:

FIG. 1 shows a schematic block diagram of an apparatus for automated driving of a motorized transportation vehicle.

DETAILED DESCRIPTION

Motorized transportation vehicles are already known that drive in automated state. The motorized transportation vehicles may be automobiles, trucks or buses.

A common feature of the disclosed embodiments is that they have at least one controller that is responsible for navigation planning and trajectory planning. This may be a central controller or else the functionality is distributed over multiple controllers. Further, such motorized transportation vehicles have subsystems that implement driving-dynamics demands from the controller or supply surroundings data. In this case, by way of example, one subsystem is a service brake system, one subsystem is a parking brake system, one subsystem is a steering system, one subsystem is a drive system and one subsystem is an ambient sensor system for capturing lanes, obstacles and other motorized transportation vehicles. The controller then takes the planned trajectory as a basis for generating control signals for the subsystems, which are then implemented by the latter. These subsystems are configured such that a single error cannot result in total failure of the subsystem. This can be accomplished by redundancies or fallback levels. In the case of the latter, less than the full performance level is frequently made available in the event of a fault, but enough performance level to still bring the motorized transportation vehicle to a standstill at a safe location.

WO 2010/048611 A1 discloses such an apparatus for automated driving, wherein the subsystems are configured redundantly and an emergency stop is performed in the event of a fault.

Disclosed embodiments provide a method for automated driving of a motorized transportation vehicle such that the availability of the function is improved. Disclosed embodiments also provide an apparatus for automated driving that likewise improves the availability of the function.

The method for automated driving of a motorized transportation vehicle is affected by at least one controller for navigation planning and trajectory planning of an automated journey by the motorized transportation vehicle and multiple subsystems, wherein the subsystems implement driving-dynamics demands from the controller or supply surroundings data. The subsystems are, by way of example, a service brake system, a parking brake system, a steering system or a drive system and also a sensor system for capturing lanes, obstacles and other transportation vehicles. In this case, at least one subsystem has an assigned monitoring function by which the functionality of the subsystem is ascertained. The monitoring function may be part of the subsystem in this case, or an external observer. By way of example, the braking system is activated in particular situations and the brake pressure is measured (e.g., at a standstill at a red traffic light). The monitoring function transmits to the controller a currently possible performance level. The currently possible performance level can be transmitted qualitatively or quantitatively. Qualitatively, the message consists only of the information that the performance level is limited, for example, whereas the quantitative transmission results in a specific number or numerical range being indicated, for example, how great the maximum possible braking deceleration currently is. The indication of the currently possible maximum performance level can also cover a period within which the performance level still exists. The controller then takes the transmitted performance level as a basis for adapting the navigation planning and trajectory planning such that despite a reduced performance level the automated journey can be continued. In this case, the trajectory planning depicts the short-term future path of movement of the motorized transportation vehicle within the possible lanes, whereas the navigation planning depicts the longer-term journey route (take the freeway from A to B). The adaptation can be effected in both planning instances in this case, but may be restricted to one planning instance depending on the transmitted performance level. In this case, there may be provision for all subsystems to have a monitoring function and to transmit their performance level to the controller. In this case, there may be provision for some subsystems to transmit the performance level quantitatively and others only qualitatively.

In at least one disclosed embodiment, the controller additionally computes stabilization functions (such as, e.g., ESP interventions), wherein a reduced performance level of at least one subsystem results in the navigation planning and trajectory planning being adapted such that stabilization functions do not have to be performed. This can be achieved, e.g., by a consciously defensive driving style.

In at least one disclosed embodiment, a reduced performance level of at least one subsystem results in road sections having predetermined properties no longer being taken into consideration in the navigation planning. Thus, by way of example, a reduced performance level of the service brake system can result in there being provision for roads having a gradient greater than a limit value for the gradient no longer being used. If such roads have been included in the navigation planning, then the controller computes an alternative route excluding such roads. A reduced performance level of the steering system can result in winding roads being removed, for example. The basic idea in this case is to use specific road sections for the navigation planning that are able to be used safely with the reduced performance level, so that despite the reduced performance level the automated driving can be continued.

In a further disclosed embodiment, the speed of the motorized transportation vehicle and/or a safety distance to be kept from a motorized transportation vehicle traveling ahead is increased. The effect of both measures is that despite a reduced performance level of the service brake device the journey can be continued. Both measures represent changes to the trajectory planning in this case.

In a further disclosed embodiment, further motorized transportation vehicles situated in the surroundings of the motorized transportation vehicle are informed about the reduced performance level and/or an adapted driving style via a Car2Car interface. This allows the surroundings to be adjusted to suit the adapted driving style and, by way of example, also allows adaptations in respect of speed and safety distance to be performed, or generally allows the trajectory planning to be adapted.

In a further disclosed embodiment, the controller, when a reduced performance level of a subsystem is transmitted, prepares at least one further system or subsystem such that the system or subsystem at least partially supports the subsystem with a reduced performance level. It is thus possible for, by way of example, a retarder or an exhaust brake to be prepared for use by virtue of the gear and/or speed being changed to ranges having better efficiencies for these systems, for example. Such brake systems are used in modern trucks. A further system is a hybrid drive system, for example, which is adjusted for increased regenerative braking when performance level is reduced. A reduced performance level of the steering system can result in steering interventions also being implemented by unbalanced braking interventions, which may require the speed to be adapted beforehand such that the service brake is available therefor.

In a further disclosed embodiment, the navigation planning takes the reduced performance level as a basis for ascertaining a suitable stopping point for the motorized transportation vehicle, for example, a garage that can still be reached, a suitable car park or the next emergency stopping bay.

FIG. 1 depicts an apparatus 1 for automated driving of a motorized transportation vehicle. The apparatus 1 comprises a controller 2, various subsystems 3-7, a Car2Car interface 8 and further systems 9-11. The controller 2 is responsible for the navigation planning and trajectory planning and also stabilization functions for the automated journey. In this case, the controller 2 may be a single central controller or else be split over multiple controllers. The controller 2 is bidirectionally connected to the subsystems 3-7. The subsystems 3-7 in this case are the sensor system (e.g., camera, radar, ultrasound, lidar, etc.) and actuator system of the apparatus 1. Thus, by way of example, the subsystem 3 is at least one sensor unit for capturing the surroundings of the motorized transportation vehicle, the subsystem 4 is a service brake system, the subsystem 4a is the parking brake system, the subsystem 5 is a steering system, the subsystem 6 is a drive system and the subsystem 7 is a gearbox system. The subsystems 3-7 implement nominal presets in this case, which the controller 2 prescribes on the basis of the navigation planning and trajectory planning and also the stabilization functions. The subsystems 3-7 transmit their performance level to the controller 2 in advance in this case. To this end, the subsystems 3-7 have monitoring functions by which the available performance level can be ascertained qualitatively or quantitatively. In this case, this statement can consist in what maximum nominal preset the subsystem 3-7 is actually able to implement, for example. In the case of the service brake system, this may be a value for a maximum deceleration, for example. The statement can alternatively consist in a subfunction not being available (e.g., 4th gear currently unavailable) or in a particular nominal preset being available only for a limited time and/or for a limited number of actions. Therefore, the controller 2 can adapt the nominal presets for the subsystems 3-7 to suit the available performance level of the subsystems 3-7. The controller 2 can use the Car2Car interface 8 in this case to inform other motorized transportation vehicles in the surroundings about its adapted driving style. Furthermore, the Car2Car interface 8 can also be used to receive information from other transportation vehicles (for example, that they have also adapted their driving behavior on the basis of a reduced performance level) and to take the information into consideration in the navigation planning and trajectory planning in the controller 2. The controller 2 is in this case connected to the Car2Car interface 8 via a bus system 12, via which the controller 2 can obtain further information from other controllers and sensor systems. The further systems 9-11 are a retarder, an exhaust brake and an electric machine or a hybrid controller, for example. Finally, the controller 2 also outputs actuating signals S for further systems, such as direction-of-travel indicators, for example, in advance.

The action of the apparatus 1 will be explained briefly using a scenario. In this case, it can be assumed that the service brake system has reported a reduced performance level to the controller 2, whereas all other subsystems have full performance level. The controller 2 reacts to the reduced performance level by reducing the speed as a nominal preset for the subsystem 6. Additionally, the controller 2 adapts the safety distance from a motorized transportation vehicle traveling ahead during its trajectory planning. The gearbox system is adjusted by an adapted nominal preset such that at least one of the systems 9-11 can operate at an operating point with good efficiency if required, to make additional braking power available. As a result, the automated journey can be continued, at least until a safe parking space is reached, despite reduced performance level or even partial failure of a subsystem 3-7.

The invention claimed is:

1. A method for assisted, partially automated, highly automated, fully automated or driverless driving of a transportation vehicle, by at least one controller for computing stabilizing functions and performing navigation planning and trajectory planning for the assisted, partially automated, highly automated, fully automated or driverless journey by the transportation vehicle, a sensor subsystem, and multiple second subsystems, the method comprising:

receiving, by the multiple second subsystems, driving-dynamics demands for operating the transportation vehicle from the at least one controller, wherein the second subsystems provide transportation vehicular functionality and consist of steering, braking, drive, and vehicular transmission subsystems;

implementing the driving-dynamics demands received from the at least one controller by the second subsystems to operate the transportation vehicle;

implementing, based on the stabilization functions and on the navigation planning and trajectory planning, one or more presets in each of the multiple second subsystems, each preset corresponding to a parameter of the respective second subsystem;

ascertaining a functionality performance level of at least one of the multiple second subsystems by measuring its transportation vehicular functionality based on monitoring of the at least one second subsystem, the ascertained functionality performance level providing a determined quantitative value or range indicative of the monitored at least one second subsystem;

transmitting, to the at least one controller, the ascertained functionality performance level of the at least one of the multiple second subsystems; and adapting, by the at least one controller, the navigation planning and trajectory planning based on the transmitted functionality performance level to enable continuation of the assisted, partially automated, highly automated, fully automated or driverless journey, accounting for functionality performance level reduction indicated by the transmitted functionality performance level, wherein the adapted navigation planning and trajectory planning includes the controller omitting performance of the stabilization functions for the adapted navigation planning and trajectory planning.

2. The method of claim 1, wherein road sections having predetermined properties are ignored from consideration in the navigation planning.

3. The method of claim 1, wherein the speed of the motorized transportation vehicle is reduced and/or a safety distance to be kept from a motorized transportation vehicle traveling ahead is increased.

4. The method of claim 1, wherein further motorized transportation vehicles situated in the surroundings of the motorized transportation vehicle are informed about the reduced performance level and/or the adapted driving style via a Car2Car interface.

5. The method of claim 1, further comprising preparing, by the controller, at least one further system such that the system at least partially supports the second subsystem when the reduced performance level of the second subsystem is transmitted.

6. The method of claim 1, wherein the navigation planning ascertains a suitable stopping point based on the reduced performance level.

7. An apparatus for assisted, partially automated, highly automated, fully automated or driverless driving of a motorized transportation vehicle, the apparatus comprising:

at least one controller for computing stabilization functions and performing navigation planning and trajectory planning;

a sensor subsystem; and multiple second subsystems, wherein the second subsystems receive, from the at least one controller, driving-dynamics demands for operating the transportation vehicle, wherein the second subsystems provide transportation vehicular functionality and consist of steering, braking, drive, and vehicular transmission subsystems, wherein the second subsystems implement the driving-dynamics demands received from the at least one controller by the second subsystems to operate the transportation vehicle, wherein the second subsystems implement one or more presets in each of the second subsystems based on the stabilization functions and on the navigation planning and trajectory planning, each preset corresponding to a parameter of the respective second subsystem, wherein at least one second subsystem ascertains a functionality performance level of at least one second subsystem by measuring its transportation vehicular functionality, the ascertained functionality performance level providing a determined quantitative value or range indicative of the second subsystem;

wherein the at least one subsystem transmits to the at least one controller the ascertained functionality performance level of the at least one of the multiple second subsystems, wherein the at least one controller adapts the navigation planning and trajectory planning based on the transmitted functionality performance level to enable continuation of the assisted, partially automated, highly automated, fully automated or driverless journey, accounting for functionality performance level reduction indicated by the transmitted functionality performance level, wherein the adapted navigation planning and trajectory planning includes the controller omitting performance of the stabilization functions for the adapted navigation planning and trajectory planning.

8. The apparatus of claim 7, wherein the controller is configured such that, when the reduced performance level of the second subsystem is transmitted, at least one further subsystem is prepared such that said system at least partially supports the second subsystem.

9. The apparatus of claim 8, wherein the second subsystem is a service brake, wherein the at least one further system is a retarder and/or exhaust brake and/or a regenerative brake of an electric machine.

10. The method of claim 1, wherein the sensor subsystem supplies surroundings data of the vehicle.

11. The apparatus of claim 7, wherein the sensor subsystem supplies surroundings data of the vehicle.

12. The method of claim 1, wherein transmitting the ascertained functionality performance level comprises transmitting an indication of a maximum value of the presets that each of the at least one of the multiple second subsystems is capable of implementing.

13. The method of claim 1, wherein transmitting the ascertained functionality performance level comprises transmitting an indication that one of the presets associated with the at least one of the multiple second subsystems has limited availability.

14. The method of claim 1, wherein adapting the navigation planning and trajectory planning based on the transmitted functionality performance level comprises adapting the one or more presets of the at least one of the multiple second subsystems to the ascertained functionality performance level.

* * * * *